Sept. 11, 1956      D. W. MAYER      2,762,943
IMAGE REPRODUCING TUBE
Filed July 13, 1953
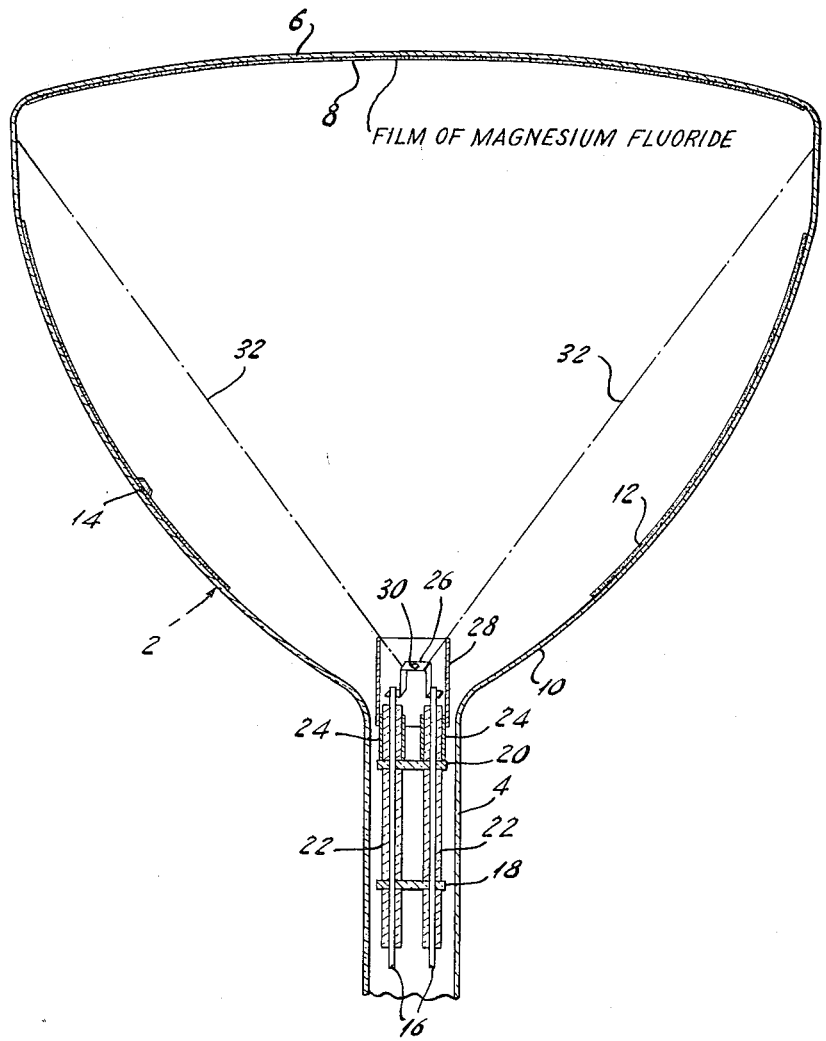
INVENTOR
DONALD W. MAYER
BY
Eyre, Mann & Burrows
ATTORNEYS

United States Patent Office 2,762,943
Patented Sept. 11, 1956

2,762,943

IMAGE REPRODUCING TUBE

Donald W. Mayer, Colonia, N. J., assignor to Tung-Sol Electric Inc., a corporation of Delaware Application July 13, 1953, Serial No. 367,385

5 Claims. (Cl. 313—92)

The present invention relates to direct view image reproducing tubes such as are employed in conventional television receivers and comprises an improved luminous screen for such tubes that has a long operating life, adheres well to the tube wall, and is not subject to damage from ion bombardment when the tube is operated at high voltage.

With the recent trend toward larger and larger picture tubes, it has been necessary, in order to obtain sufficient luminosity over the entire picture area, to increase the operating potential of the tube or to provide aluminized screens. The phosphor mixes which were satisfactory for the smaller size tubes, both from the standpoint of luminosity and adhesion to the glass wall of the tube, do not stand up well under high voltage conditions and develop after a short period of operation a discoloration in the form of a "bowtie" or cross. This discoloration or "X-burn" as it is called, is believed to be due to insufficinet emission by the screen of secondary electrons when scanned by the electron beam. This results in a reduction in screen potential as compared to that applied to the conductive coating on the inner walls of the tube and consequently positive ions given up by the tube walls are attracted to, and bombard, the screen causing damage thereto.

In order to avoid the expense involved in providing aluminized screens, tube manufacturers have tried various expedients in attempts to make the luminous screen stand up under high voltage conditions. One such expedient was to provide a thin film of silica over the individual phosphors of the mix prior to formation of the screen. This resulted in a screen that had a slightly improved resistance to X-burn but one that had poor adhesion to the tube wall.

In accordance with the present invention it has been found that a very thin layer, of the order of 150 Angstroms, of magnesium fluoride over a conventional phosphor screen is extremely effective in protecting the screen from damage. The thin layer of the fluoride has little or no appreciable effect upon the luminosity of the screen and yet appears to solve the problem and yield a tube that can be used with operating voltages as high as 18 to 20 kv. The exact reason why the layer of magnesium fluoride is so effective in preventing X-burn is not clearly understood but it is possible that the magnesium fluoride layer may emit tertiary electrons as the result of the release of secondary electrons from the underlying phosphor screen. The layer is applied by evaporation onto a previously formed phosphor screen. The underlying phosphor screen may be of any composition that has been found to give adequate luminosity in direct view image reproducing tubes of the type employed for black and white television reception and that adheres well to the glass walls of the tubes. Screens for direct view television receivers are identified in the industry as P4 screens. This designation, at the present time, is being applied to phosphor mixes that are unsilicized and also to mixes that are silicized. The screen upon which the magnesium fluoride film is applied in accordance with the present invention, can thus be classified as an unsilicized P4 screen. A phosphor mix of 60 to 40 percent zinc sulphide and 40 to 60 percent zinc cadmium sulphide, each activated with silver, is typical of the underlying screen composition to which the magnesium fluoride layer may be added for effective protection against X-burn. The proportion of the sulphides may vary according to the color of screen desired, the screen appearing blue when the zinc sulphide predominates and yellow when the zinc cadmium sulphide predominates. Other phosphors in small amounts, for example, one percent of zinc silicate activated with magnesium may be added to the phosphor mix to give a purple tint to the screen.

By forming the magnesium fluoride film by evaporation, good control of film thickness and uniformity is obtained. A measured quantity of the fluoride in powder form is placed on a conductive ribbon of tantalum or the like which is supported within the tube and heated by passage of current therethrough. A shield about the ribbon protects the tube walls from radiated heat and prevents deposition of the fluoride on the conductive coating on the inner walls of the tube.

The single figure of the drawing illustrates a cathode ray tube in the process of having a magnesium fluoride film evaporated onto a phosphor screen by the method briefly described above. In the drawing a cathode ray tube blank 2 is shown with its conventional long neck portion 4 within which the gun structure will be mounted, with its large end wall 6 upon which an unsilicized P4 screen 8 has been formed by known techniques and with its flaring side walls 10 joining the neck portion and end wall and upon which a wide band 12 of conductive material has been deposited, also by known techniques, to provide the second anode to which high voltage is applied through the terminal 14. The tube in this stage of manufacture is ready for application of the film of magnesium fluoride to the screen. A pair of heavy (for example No. 8) copper wires 16 extend through spaced holes in a porcelain disc 18 and through similar holes in a second porcelain disc 20. Ceramic insulating sleeves 22 are provided about the wires 16 between the discs 18 and 20 and about the portions of the wires extending beyond the discs. The sections 22 beyond the disc 20 are sheathed in nickel sleeves 24 and the ends of a ribbon 26 of tantalum are crimped to the ends of the copper wires 16 which protrude beyond the ceramic sleeves 18 and nickel sleeves 24. A cylindrical shield 28 of nickel, of a diameter less than the bore of neck 4 and of a length greater than the spacing between the ribbon 26 and adjacent surface of disc 20 is positioned about the parts extending beyond the disc 20. A measured quantity 30 of magnesium fluoride, moistened with water, is placed on the ribbon 26 and the whole assembly introduced into the neck of the tube 2 far enough to bring the ribbon into the beginning of the flared portion of the tube. When alternating current of about 25 amperes is passed through the circuit including the wires 16 and ribbon 26, the magnesium fluoride evaporates and deposits on the screen 8 and adjacent walls over an area defined by the dashed lines 32. The shield 28 prevents overheating by radiation of the glass walls of the tube and also prevents deposition of the fluoride on the conductive coating 12. The amount of powdered magnesium fluoride should be such as to deposit a film thickness of from 100 to 200 Angstroms. The weight of the fluoride and the optimum location of the tantalum strip will depend, of course, upon the size of screen to be covered and the configuration of the tube. For example, 20 milligrams of magnesium fluoride evaporated from a tantalum ribbon placed 25 centimeters from the center of the screen of a 17BP4 or 17LP4 will produce a film of about 150 A. which covers the entire screen area as well as part of the uncoated walls of the tube beyond the conductive coating 12. The extension of the film to the glass walls of the tube adjacent the screen appears preferable.

From the foregoing description it will be apparent that the invention comprises an improved direct view television receiving tube that has an unaluminized screen that is not subject to damage under high operating voltages. Although, as heretofore indicated, the protective film of magnesium fluoride is believed to increase secondary emission from the screen and to discourage ion emission from the glass walls, the invention is not dependent upon any particular theory as to the cause of the determined improvement in screen life. Also, although the protective film is preferably formed by evaporation onto the screen, the invention in its broadest aspects is not limited to any particular method of application.

The following is claimed:

1. A direct view television receiving tube having an unaluminized phosphor screen provided with an overlying film of magnesium fluoride, the thickness of said film being such as to afford protection of the phosphor screen from damage due to ion bombardment without substantial reduction in luminosity of the screen.

2. The direct view television receiving tube according to claim 1 wherein said film extends beyond the screen area.

3. In a direct view television receiving tube having an unsilicized zinc sulphide zinc cadmium sulphide phosphor mix screen and a conductive coating on the inner walls thereof which terminates short of the screen, the improvement which comprises a film of magnesium fluoride overlying said screen and part of the tube walls between the screen and the conductive coating, the thickness of said film being such as to afford protection of the phosphor screen from damage due to ion bombardment without substantial reduction in luminosity of the screen.

4. A direct view television receiving tube having an unaluminized phosphor screen provided with an overlying film of magnesium fluoride having a thickness of from 100 to 200 Angstrom units, said tube being adapted to be subjected to operating voltages of the order of 20 kv. without substantial damage to the phosphor screen from ion bombardment.

5. The direct view television receiving tube according to claim 4 wherein the thickness of said film is about 150 Angstrom units.

References Cited in the file of this patent

UNITED STATES PATENTS

| Re. 22,076 | Cartwright et al. | Apr. 21, 1942 |
| 2,233,786 | Law | Mar. 4, 1941 |
| 2,586,752 | Weber et al. | Feb. 19, 1952 |
| 2,616,057 | Coltman | Oct. 28, 1952 |

OTHER REFERENCES

Koch: abstract of application Serial Number 763,927, published July 18, 1950, 636 O. G. 1032.